UNITED STATES PATENT OFFICE.

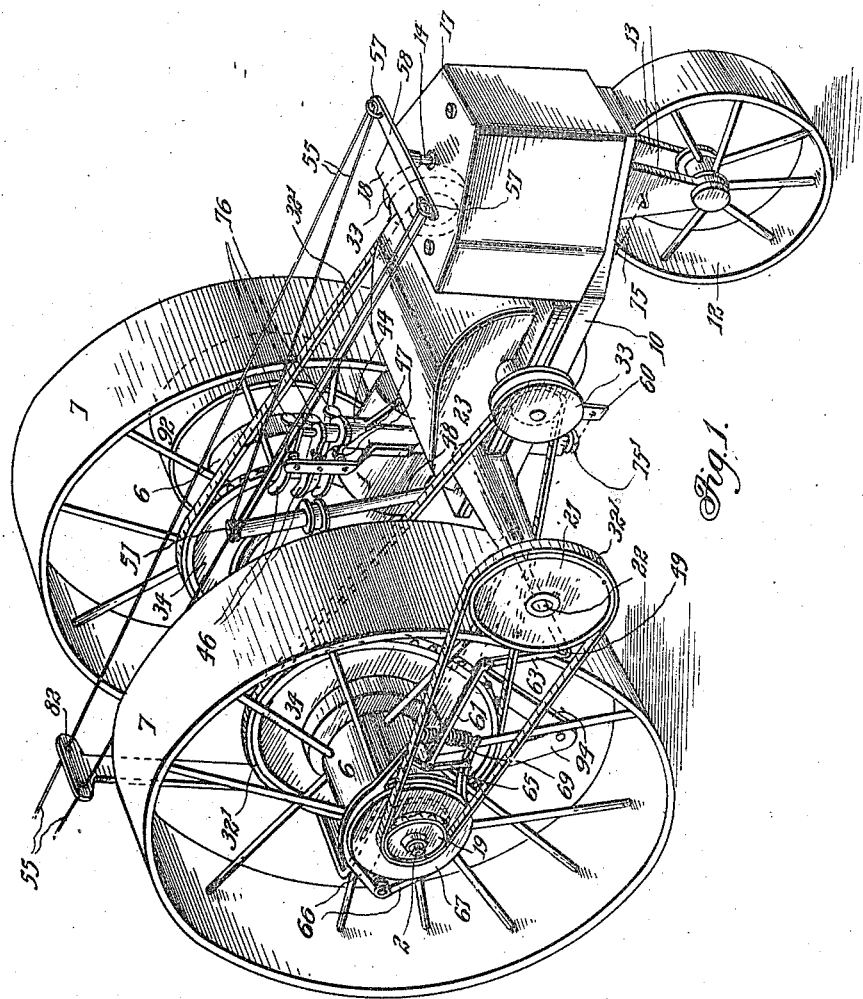

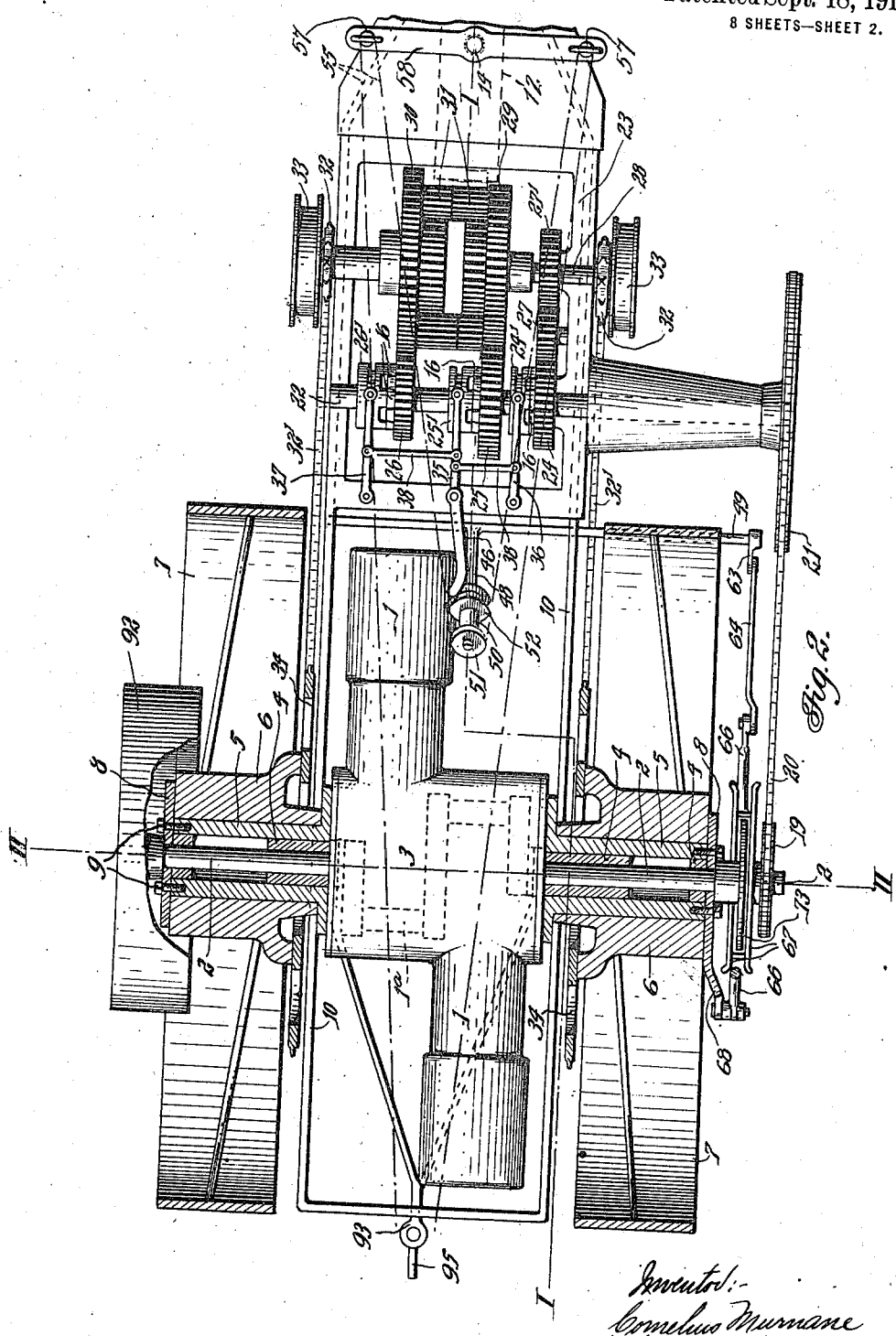

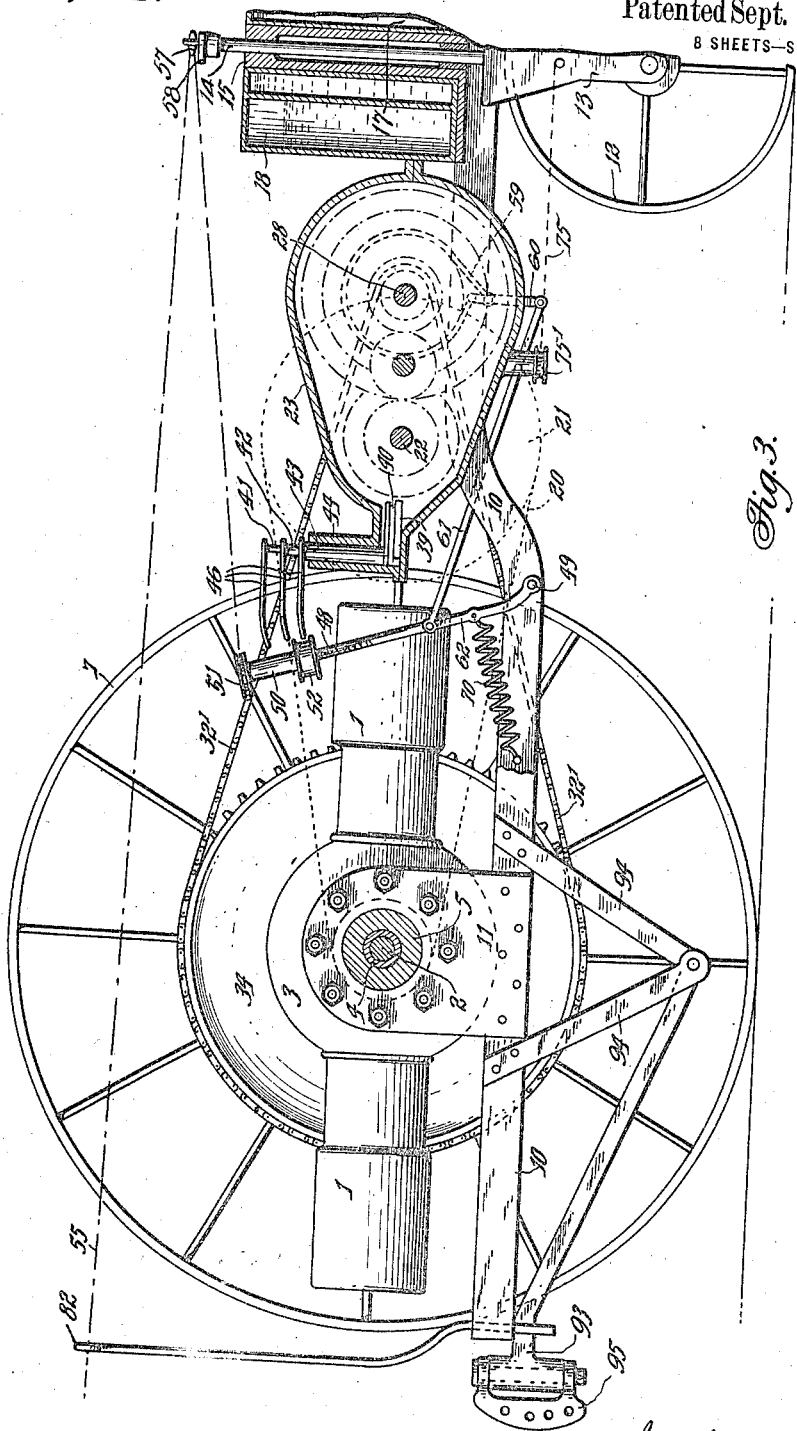

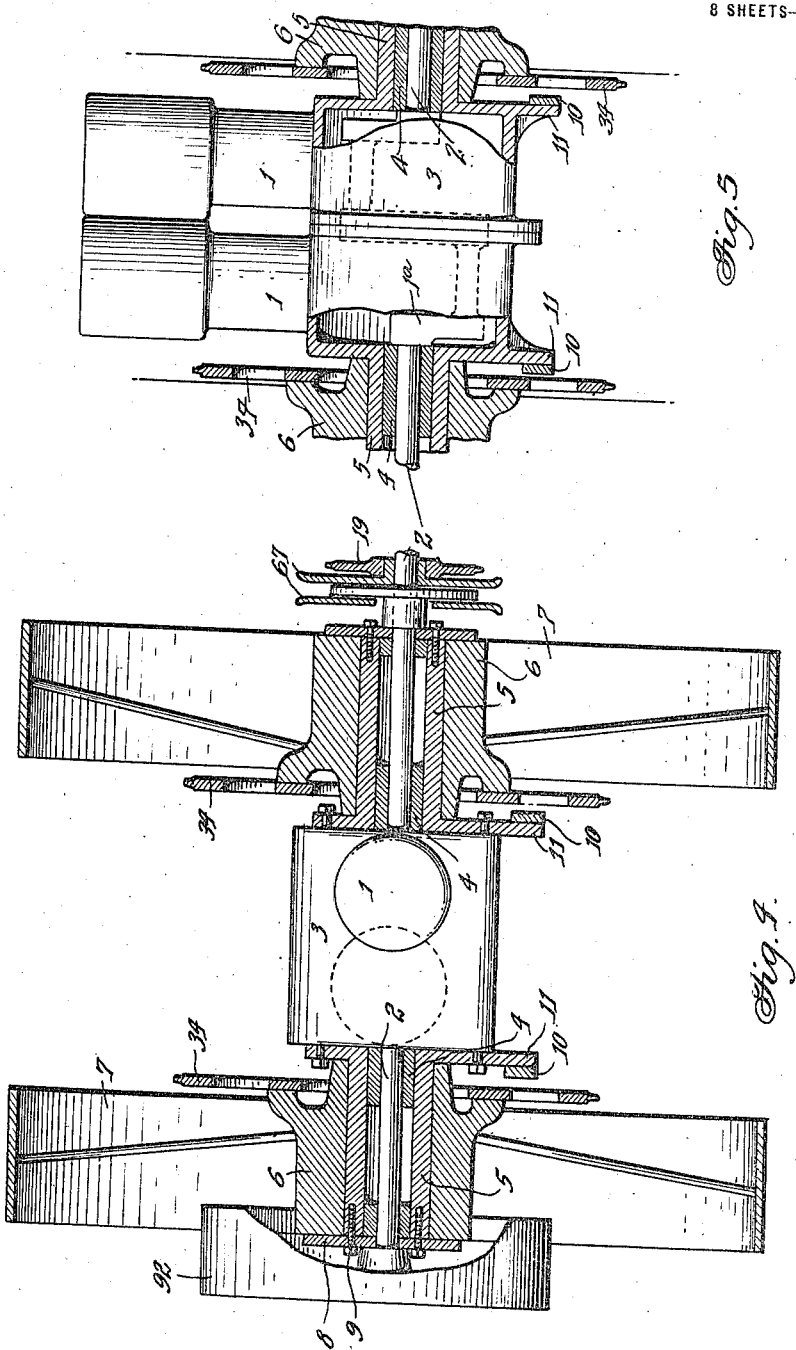

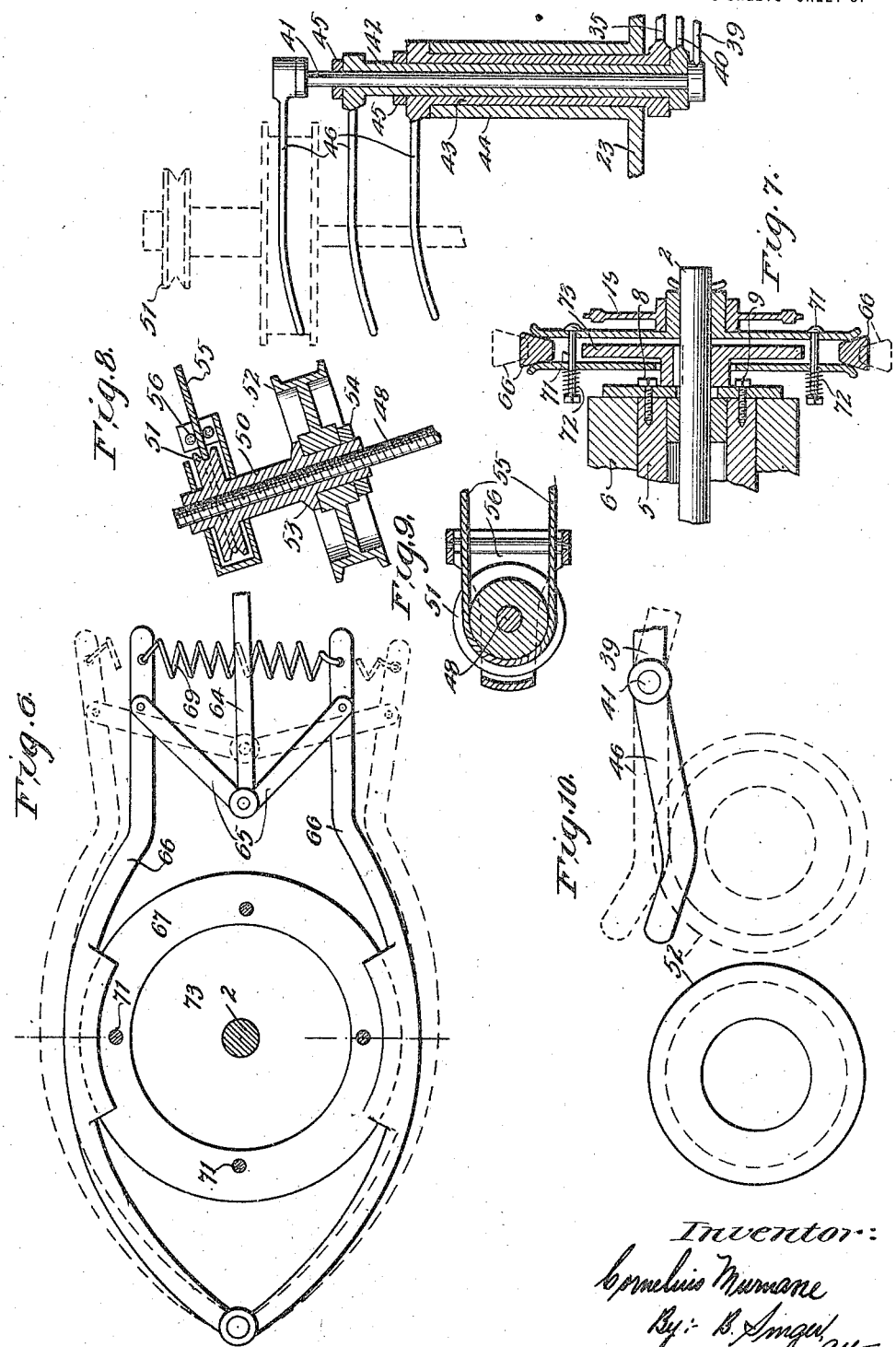

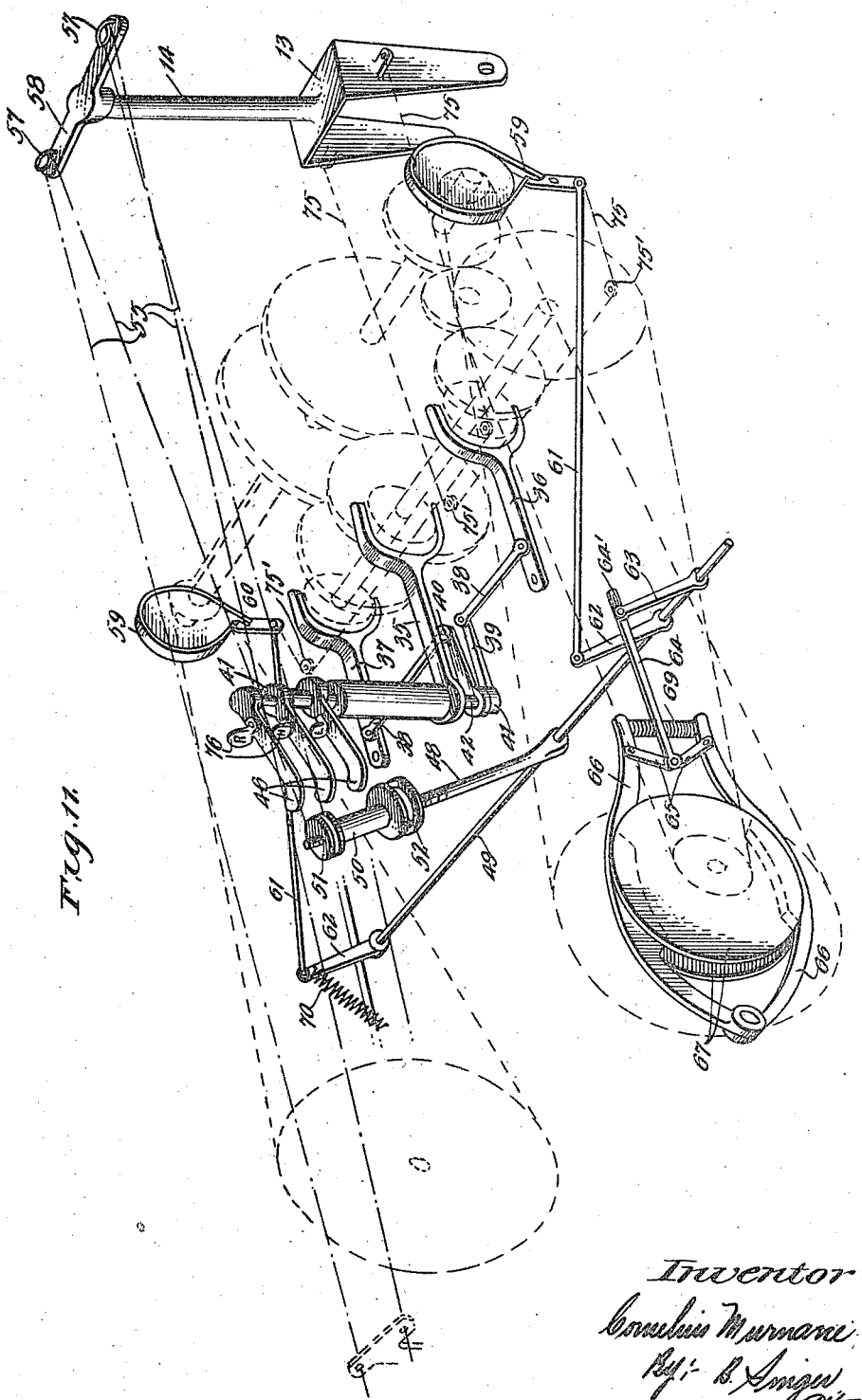

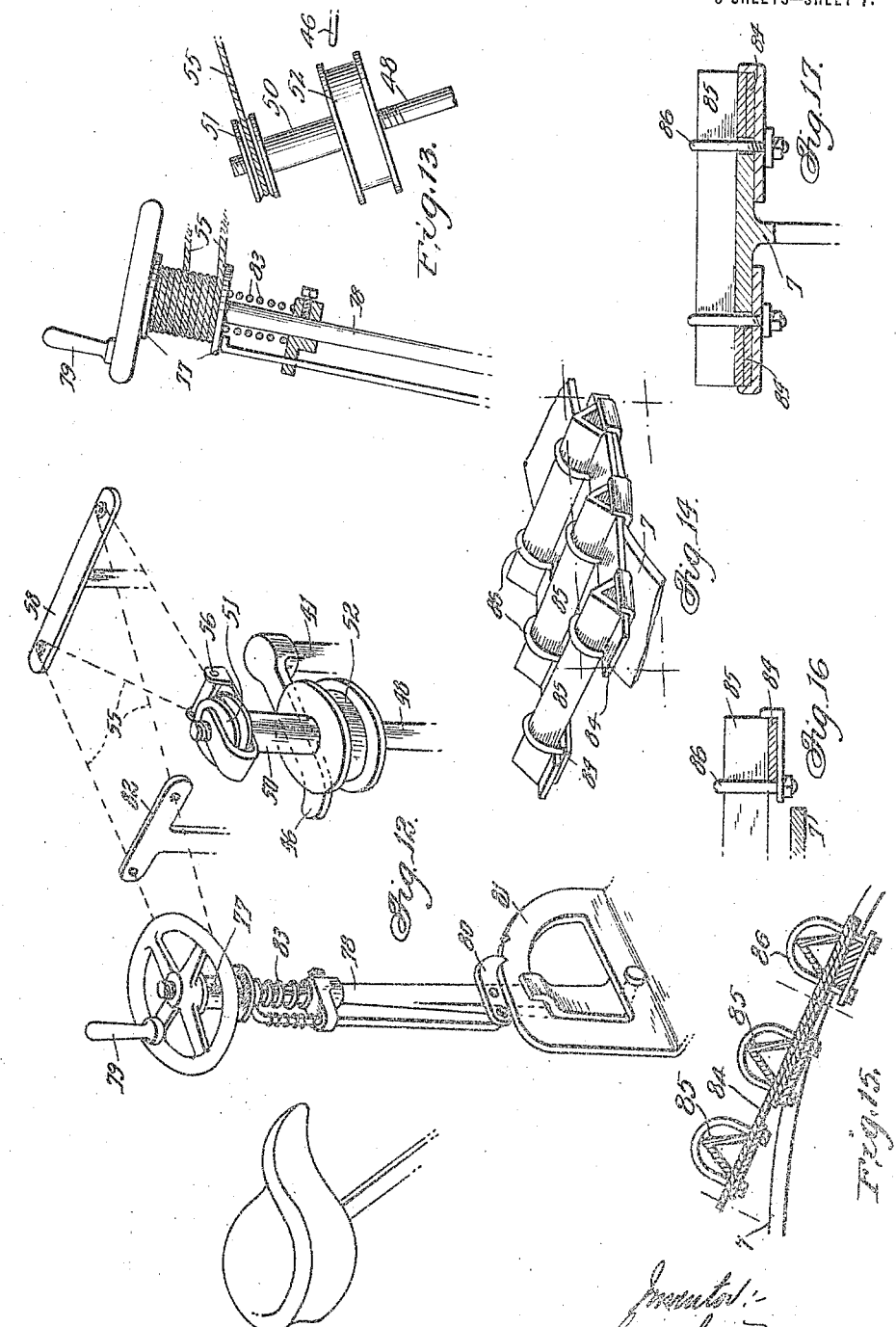

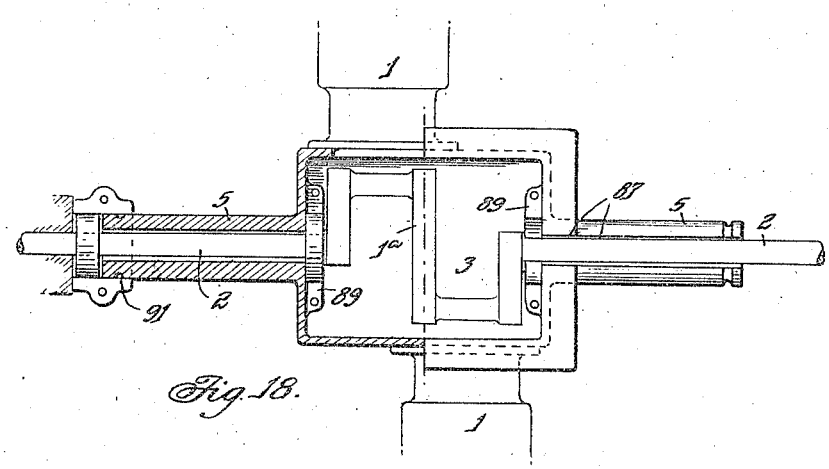
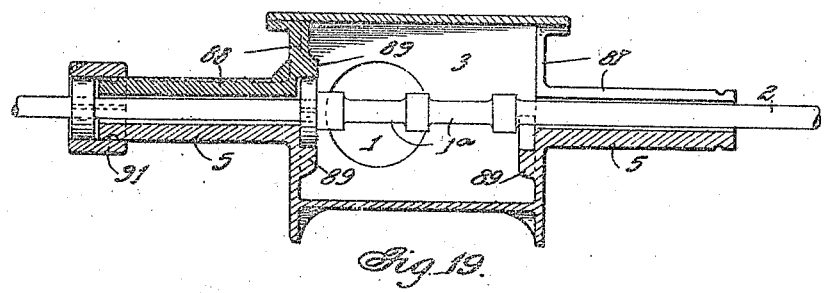
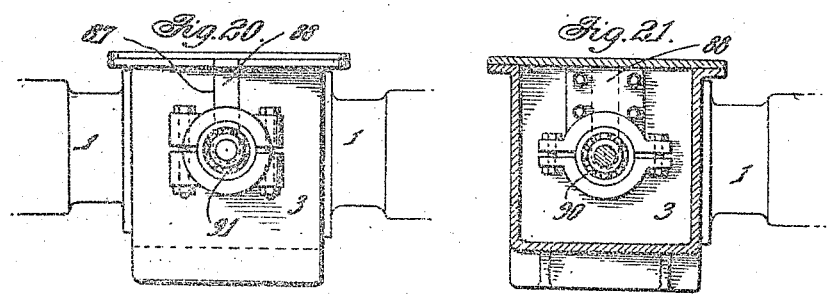

CORNELIUS MURNANE, OF HABERFIELD, NEW SOUTH WALES, AUSTRALIA.

FARM-TRACTOR.

1,240,761.  Specification of Letters Patent.  Patented Sept. 18, 1917.

Application filed November 16, 1915. Serial No. 61,771.

*To all whom it may concern:*

Be it known that I, CORNELIUS MURNANE, of St. Lucia, 130 Dalhousie street, Haberfield, in the State of New South Wales, Commonwealth of Australia, have invented certain new and useful Improvements in Farm-Tractors, of which the following is a specification.

This invention relates to an improved tractor for hauling wagons, farm machinery and the like and it has been devised in order to provide a tractor having comparatively few and extremely simple working parts which are constructed and arranged in such a manner that the operative mechanism may be controlled by reins or the like flexible members from any convenient point.

A salient feature of the invention is the novel construction and arrangement of the engine whereby the necessity of providing a frame for mounting it on the hauling wheels is obviated.

The invention also comprises improved control mechanism, and means employed to provide efficient haulage grip for the road wheels are hereinafter described.

With these and other objects in view the invention consists of the features of construction, combination and arrangement of parts hereinafter fully described with reference to the drawings, wherein—

Figure 1 is a view in perspective of a tractor constructed in accordance with the present invention.

Fig. 2 is a view in sectional plan of the same.

Fig. 3 is a view in sectional side elevation taken on the dotted line I—I of Fig. 2.

Fig. 4 is a view in cross section of the rear part of the tractor taken on the dotted line II—II of Fig. 2.

Fig. 5 is a view in sectional elevation of part of the tractor showing a vertical engine fitted to the hauling wheels.

Figs. 6 to 10 are views illustrating various constructional details of the invention.

Fig. 11 is a diagrammatic view showing the control mechanism part being shown in full and part being shown in dotted lines.

Figs. 12 and 13 are views illustrating further constructional details of the invention and hereinafter are fully described.

Figs. 14 to 17 are views of details in the construction of the hauling wheels of the tractor.

Figs. 18 to 21 illustrate constructional modifications in formation of the crank case of the engine and hereinafter are fully described.

Throughout the drawings like characters of reference have been employed to indicate similar or corresponding parts in the different views and the numeral 1 designates a two cylinder two-cycle horizontally opposed internal combustion engine the pistons (not shown) of which are operatively connected to cranks $1^a$ formed on a transverse crank-shaft 2.

The crank-shaft 2 is mounted in bearings made in the form of sleeves which are bolted to and extend laterally from the sides of the crank-case 3. The sleeves are provided with wearing bushes 4 and their outer peripheries are turned up in a lathe to form hollow axles 5 for the hubs 6 of two hauling wheels 7. The engine is thereby hung in the hubs 6 of the road wheels without any intervening frame work or other support. The road wheels 7 are retained on the axles by means of washers 8 which are secured to the ends of said axles by means of set-screws 9.

A rectangular frame 10 is bolted to the lower parts of flanges 11 formed on the inner ends of the axles or on the crank case and the said frame extends forwardly to support a steering wheel 12 and control gearing.

The steering wheel 12 is mounted in a fork 13 having a vertical stem 14 which is revolubly mounted in a neck-bearing 15 supported by the forward part of the frame 10.

The power transmission gear and control mechanism is situated between the steering wheel and the engine. The fuel and water tanks 17 and 18, respectively, are mounted on the forepart of the frame 10 and are built around the neck-bearing 15 supporting the stem 14 of the steering wheel mounting. The water and liquid fuel are conveyed from the tanks 17 and 18 to the engine cylinders by suitably disposed pipes (not shown).

A sprocket 19 is carried on a friction clutch member 67 loosely mounted on one end of the crank-shaft 2 and this sprocket is connected by a chain 20 with a larger sprocket 21 fitted to the end of a shaft 22 positioned transversely on the frame 10. The shaft 22 passes through the rear part of the case 23 surrounding the transmission and change speed gear and carries three loose pinions 24, 25 and 26.

The loose pinion 24 gears with a second pinion 27 which in turn meshes with a pinion $27^1$ fitted rigidly to a shaft 28 passing transversely through the forward part of the case 23.

The pinion 25 meshes with a larger pinion 29 keyed to the shaft 28 and the pinion 26 meshes with a pinion 30 fitted to the said shaft 28.

The pinion 26 is smaller than the pinion 25 and the pinion 30 is larger than the pinion 29. A differential gear 31 of ordinary design is fitted to and located between the pinions 29 and 30 as shown in Fig. 2 of the drawings.

Each of the pinions 24, 25 and 26 are formed with clutch teeth 16 which are adapted to mesh with clutch members $24^1$, $25^1$ and $26^1$, respectively, slidably mounted on the shaft 22.

The ends of the shaft 28 project beyond the case 23 and are fitted with sprockets 32 and brake-drums 33. The sprockets 32 are connected by chains $32^1$ to larger sprockets 34 fitted to the hubs or spokes of the road or hauling wheels.

When the engine is in operation the sprocket 19, chain 20 and sprocket 21 impart a rotary movement to the shaft 22 and normally the clutch members $24^1$, $25^1$ and $26^1$ are out of mesh.

The rear ends of clutch levers 36 and 37 are pivotally mounted on the rear part of the gear case 23 and they are connected by links 38 to arms 39 and 40 projecting forwardly from the lower ends of a vertical rod 41 and sleeve 42 surrounding the same.

The rear end of the central clutch lever 35 is fitted to or formed on the lower end of a sleeve 43 fitting loosely around the sleeve 42 and said sleeve 43 is free to rock in a sleeve bearing 44 formed on the gear case 23. The rod 41 and surrounding sleeve 42 are retained in their correct working positions by collars 45 fitted removably to the same.

Projecting rearwardly from the upper ends of the rod 41 and sleeves 42 and 43 are arms 46 which curve outwardly and downwardly. The curved arms and levers connected to the clutch members are retained in their normal positions by springs 47. When the uppermost arm is pressed toward the near side of the tractor the clutch member $24^1$ is actuated to mesh with the reverse pinion 24 with the result that the shaft 28 is operated to impart a motion to the chains $32^1$ in a direction that will cause the hauling wheels to move rearwardly.

When the lowermost arm 46 is pressed toward the near side of the tractor the central clutch member $25^1$ is moved into mesh with the pinion 25 with the result that the tractor is caused to move forwardly at its maximum speed.

When the central arm 46 is pressed to the near side of the tractor the clutch member $26^1$ is moved into mesh with the pinion 26 thereby causing the tractor to be driven forwardly on its low gear.

Thus it will be understood that the power transmission gear provides for two different forward speeds and a reverse movement of the tractor and it will be obvious that only one of the clutch members of the gears producing these motions can be in mesh at the one time.

The arms 46 for operating the clutch members $24^1$, $25^1$ and $26^1$ are actuated by mechanism controlled by reins. The control mechanism comprises a lever 48 the lower end of which is fitted rigidly to a rocking shaft 49 mounted in bearings on the rectangular frame 10 behind the case of the power transmission gear.

The lever 48 is round in cross section and its upper end is screwed to accommodate an internally threaded sleeve 50 having a grooved pulley 51 formed on or fitted to its upper end. A flanged roller 52 is mounted loosely on the lower end of the sleeve 50 between a fixed collar 53 and a detachable collar 54.

A rope or other flexible rein 55 is passed around the grooved pulley 51 and is retained within the groove of the latter by a guide 56 fitted to the upper end of the sleeve 50 and surrounding said pulley 51.

The ends of the looped reins 55 pass forwardly from the pulley to and around sheave blocks 57 fitted to the ends of a cross bar 58 secured to the upper end of the stem 14 of the fork carrying the steering wheel 12.

The reins 55 after passing around the sheave blocks 57 pass rearwardly to a suitable point from which they can be operated conveniently in the same way as used to control a team of horses.

The brake-drums 33 are provided with flexible brake bands 59 which are fitted to levers 60 pivotally mounted on the frame 10 or on the gear case 23.

An arm 63 is fitted on the rocking shaft 49 near its off side end and this arm is connected by a rod 64 to toggle links 65 connecting the ends of two pivotally mounted levers 66. The levers 66 are curved to pass around and between the peripheries of two disks 67 mounted revolubly on the crank shaft 2. The outer disk 67 is formed with a centrally disposed boss which surrounds the crank shaft and to the periphery of said boss is rigidly secured the driving sprocket 19. A disk fly wheel 73 is keyed to the crank-shaft between the disks 67 and the inner disk 67 is revolubly mounted on the boss of the said fly wheel.

The free ends of the levers 66 are connected by a tension spring 69 which tends to keep the said levers bearing on the disks 67. The toggle links 65 incline toward the rear and a forward movement of the rod 64 extends said toggle links to move the levers 66 away from the disks as shown by dotted lines in Fig. 6 of the drawings.

The forward end of the rod 64 is slotted at $64^1$ to form a loose connection with the arm 63 so that the levers 66 will not release the disks 67 until the said arm has moved forward part of its travel. A tension spring 70 connects one of the arms on the rocking shaft 49 to the frame 10 and is employed to retain the lever 48 and other operative parts connected to said shaft in their normal positions.

The outer edges of the disks 67 are turned outwardly at a suitable angle and the contiguous parts of the levers 66 are tapered to correspond therewith. The disks 67 are resiliently connected by bolts 71 and springs 72 (see Figs. 4 and 6).

The levers 66 normally hold the disks 67 apart and also tend gradually to stop them revolving when the said levers 66 are returned to their original positions.

When the levers 66 are moved away from the disks 67 the latter are moved inwardly by the springs 72 and forced to bear against the opposite sides of the fly wheel 73 and grip the same firmly thereby forming a friction clutch which will cause motion to be transferred to the transmission gear.

When it is desired to impart a forward or reverse movement to the tractor the operator pulls on one of the reins 55 to rotate the grooved pulley 51 until the flanged roller 52 is placed opposite the particular curved arm 46 that controls the gear required to be put into operation. When the flanged roller 52 has been placed in position as above described both reins 55 are pulled rearwardly thereby causing the lever 48 to be moved forwardly and the roller 52 thereon to bear against and press outwardly the particular arm 46 required to be operated (see Figs. 8, 10 and 12 of the drawings.)

The slot $64^1$ in the rod 64 permits of the arm 63 moving forwardly until the lever 48 has moved sufficiently to cause the roller 52 to bear against the arm 46 to be actuated. The further forward movement of the lever 48 will cause the levers 66 to be moved away from the disks 67 and the clutch member to be placed fully in mesh. The initial forward movement of the lever 48 causes the clutch of the selected gear to engage prior to the engagement of the friction disks 67 and fly wheel 73, thereby enabling the transmission gear to start smoothly.

The tractor is in motion only when pulley 52 is engaging one of the levers 46. This locks the pulley 51, thereby forming a fulcrum or temporary "hold fast" for the reins at this point and providing a double purchase with the pulleys 57. The friction of the reins or cable in the grooves of the pulley 51 is sufficient to hold the said pulley in position and by pulling either rein the steering wheel can be operated without rotating the pulley 51.

The tractor will continue in motion until the reins are released when the various controlling parts will be returned to their normal position and the tractor controlled or braked by the levers 66 bearing hard on the disks 67.

To change the gear or to reverse, the reins are slackened and a new gear selected and the mechanism again placed into action, all of which can be conveniently performed from a distance as from the seat of a machine, plow, wagon or the like that the tractor is hauling.

To facilitate sharp turns being made by the tractor the opposite sides of the fork of the steering wheel are connected to the lower ends of the brake levers 60 by flexible members 75 passing around rollers $75^1$ in such a way that when the wheel is turned by pulling on one rein 55 one of the brakes will be applied and the differential gear causes one road wheel to be held while the other rotates thereby effecting a sharp turning in the desired direction.

In order to facilitate a quick and accurate selection of the correct gear the arms 46 can be fitted with indicating disks 76 provided with lettering or the like which can be easily read by the operator from any convenient distance.

The controlling ends of the reins 55 can be wrapped around a drum 77 (see Fig. 12) rotatably mounted on a lever 78 having its lower end pivotally mounted on the tractor or on the machine or implement being drawn by the tractor. The said drum is fitted with a handle 79 of approved form by the operation of which one rein or the other can be operated at will.

The said lever 78 is provided with a spring actuated pawl 80 which engages the teeth of a quadrant 81 arranged in any suitable way.

In order to slacken the reins the pawl 80 is released and the lever 78 thrown forwardly. The reins are passed through one or more suitably disposed guides 82 which can be arranged in such a way that they will prevent the said reins hanging loose and becoming entangled with the parts of the tractor or implement being hauled.

The drum 77 is slidably mounted on the lever 78 and a downward movement of the former on the latter will release the pawl 80.

The drum is returned to and retained in its normal position by a compression spring 83 immediately the downward pressure is released. The drum can be provided with a small toothed wheel which meshes with the teeth of a larger wheel placed in a suitable position. The rotation of the drum causes the small toothed wheel to be slowly revolved and markings on the said wheel pass before a fixed arm which indicates the position of the flanged roller 52 and when it is in position to engage any particular arm 46 of the clutch control lever 48.

Mounted on or suitably secured to the periphery of each of the hauling wheels are a number of equidistantly spaced spring gripping frames 84 devised to provide an effective haulage grip for the tractor in soft ground and furthermore to assist in its resilient suspension. The bars of the spring frames 84 are provided with triangular gripping members 85 which are secured firmly in position by clamps 86 or the like.

A modification of the engine and hollow axles 5 consists in providing means whereby an integrally formed crank and crank-shaft can be conveniently inserted therein or removed therefrom (see Figs. 18 to 21) of the drawings.

This modification is essential where the axles 5 are formed integrally with the crank case of the engine. The side of the crank case 3 and the upper parts of the hollow axles 5 are cut away as at 87 to permit of the crank-shaft 2 being inserted downwardly into position therein. The cut away portions of the crank case 3 and hollow axles 5 are provided with detachable filling pieces 88 which are bolted to the sides of the crank case as shown in Fig. 21 after the crank-shaft has been placed in position.

A seat 89 is formed within the crank case to accommodate ball bearings 90 for the crank-shaft 2 the outer ends of which are mounted in ball bearings 91 fitted to the hubs of the hauling wheels.

The near side end of the crank-shaft is extended to carry a belt pulley 92 by means of which motion can be transmitted to various forms of stationary machines. In order to employ the tractor as a stationary engine the chain 20 connecting the sprocket 19 with the sprocket 21 is to be removed and the hauling wheels chocked.

A hauling beam 93 is fitted to stays 94 secured to the underside and rear of the frame 10 and the rear end of said beam is furnished with a pivotally mounted vertical rack 95, to which the draft gear can be attached.

It will be obvious that a vertical engine constructed as shown in Fig. 5 of the drawings can be employed instead of the horizontal type shown in the other figures of the drawings and that various other slight and immaterial modifications can be made in the invention without departing from the spirit and scope of the same as herein described.

What I do claim is:—

1. In a farm tractor, the combination of an internal combustion engine having a crank case, hollow axles projecting axially from the said crank case, hauling wheels mounted on said axles, a crank-shaft passing through the center of the hollow axles, and means for retaining the wheels on said hollow axles, substantially as described.

2. In a farm tractor, the combination of an internal combustion engine having a crank case, hollow axles projecting laterally from the crank case, a crank shaft revoluble in said hollow axles, and road wheels revolubly mounted on said hollow axles, substantially as described.

3. In a farm tractor, the combination of an internal combustion engine having a crank case, hollow axles projecting laterally from said crank case, hauling wheels revolubly mounted on said hollow axles, wearing bushes fitted concentrically in said axles, and a crank-shaft revolubly mounted in said bushes, substantially as described.

4. In a farm tractor, the combination of an internal combustion engine having a crank case, hollow axles projecting laterally from the crank case, wearing bushes in said hollow axles, a crank-shaft mounted in said wearing bushes, a wheel and engine brake fitted to one end of the crank-shaft, hauling wheels mounted on said hollow axles and means for retaining said hauling wheels on the hollow axle, substantially as described.

5. In a farm tractor, the combination of an internal combustion engine having a crank case, hollow axles projecting laterally from the crank case, wearing bushes in said hollow axles, a crank-shaft mounted in said wearing bushes, a wheel and engine brake fitted to one end of the crank-shaft, hauling wheels mounted on said hollow axles and means for conveying motion from the wheel on the crank-shaft to the hauling wheels, substantially as described.

6. In a farm tractor the combination of an engine having hollow axles fitted thereto and projecting laterally therefrom, a crank-shaft passing through said hollow axles, and hauling wheels mounted on said hollow axles, substantially as described.

7. In a farm tractor, the combination of an internal combustion engine, hollow axles projecting from the crank case of said engine, a crank-shaft revolubly mounted in the hollow axles, hauling wheels on said axles, a gear wheel on one end of the crank-shaft, chain gearing connecting the gear wheel with power transmission gear, nd means for operatively connecting the power transmission gear with gear wheels fitted to the hauling wheels, substantially as described.

8. In a farm tractor, the combination of an engine having hollow axles projecting from the crank case thereof, a crank-shaft passing through the hollow axles, hauling wheels on said hollow axles, chain and sprocket gearing connecting the crank-shaft to a shaft passing through power transmission gear, pinions loosely mounted on said shaft meshing with pinions on a second shaft, clutch members fitted slidably on the first-mentioned shaft, clutch teeth on the loosely mounted pinions, levers for operating said clutch members, and chain and sprocket gearing connecting the second-mentioned shaft with the hauling wheels, substantially as described.

9. In a farm tractor, the combination of an engine having hollow axles projecting laterally from the crank case, hauling wheels on the said axles, a crank-shaft passing through the center of the hollow axles, sprocket and chain gearing operatively connecting the crank-shaft to the power transmission gear, a frame supporting the transmission gear, a steering wheel mounted on the front end of said frame, and lugs on the engine supporting the rear end of the frame, substantially as described 10. In a farm tractor, the combination of power transmission gear comprising forward and reverse gearing, clutches for putting said gearing in operation, levers on said clutches, a vertical rod and sleeves operatively connected to said levers, arms on said rod and sleeves, a pivoted lever having a grooved pulley and flanged roller fitted adjustably to its upper end, and reins passing around said pulley, substantially as described and for the purposes set forth.

11. In a farm tractor, the combination of levers connected to clutch members of a power transmission gear, connections between said levers and arms on a vertical rod and concentrically arranged sleeves, rearwardly projecting curved arms on the said rod and sleeves, a selector lever having its lower end fitted to a rocking shaft, a sleeve screwed to the upper end of said selector lever having a fixed pulley and loose roller thereon, reins passing around the pulley, a guide on the sleeve for said reins, arms on the rocking shaft, link connections between said arms and a brake on the crank-shaft and brakes on the power transmission gear, and a spring for returning and retaining the rocking shaft in its normal position, substantially as described.

12. In a farm tractor, the combination with clutch selecting members for the change speed and reverse gearing of power transmission gear, of a pivoted lever, an adjustable sleeve screwed to the said lever, a pulley fixed to and a roller revolubly mounted on said sleeve, a cross bar on the stem of a steering wheel, sheave blocks on said cross bar, reins passing around said pulley through the sheave block, and rearwardly to a seat on the tractor or machine being hauled thereby, substantially as described.

13. In a farm tractor, the combination with clutch selecting members for the change speed and reverse gearing of power transmission gear, of a lever fitted to a rocking shaft, arms on said shaft, links connecting said arms with brakes on the transmission gear, and a friction clutch on the crank-shaft of an engine driving the said transmission gear, substantially as described.

14. In a farm tractor the combination with arms fitted to clutch operating levers for change speed and reverse gears, of indicating disks fitted to said arms, substantially as described.

15. In a farm tractor the combination with curved arms fitted to clutch operating levers for change speed and reverse gears, of springs bearing against and adapted to return said arms and levers to their normal positions after operation, substantially as described.

16. In a farm tractor, the combination of an engine having a crank case, hollow axles projecting laterally from the crank case, hauling wheels on said axles, a crank-shaft passing through the hollow axles, washers retaining the hauling wheels on the axles, friction disks on one end of the crank-shaft, a pair of levers pivoted to an extension of one of the retaining washers, toggle links and a spring connecting the free ends of said levers, one end of a rod pivotally connected to the toggle links and the opposite end of said rod connected loosely to an arm on a rocking shaft, a lever on the rocking shaft, means on said lever for actuating clutch levers, and change speed and reverse gears, substantially as described and for the purposes herein set forth.

17. In a farm tractor, the combination with reins for controlling the change speed and reverse gears, of a lever pivotally mounted at its lower end, a drum revolubly mounted slidably on the upper end of said lever, a spring exerting an upward pressure on said drum, the ends of the reins secured to said drum, and an operating handle on said drum, and a pawl and quadrant device for retaining the lever in position, substantially as described.

18. In a farm tractor the combination of an engine having hollow axles projecting laterally from the crank case thereof, recesses in the sides of the crank-case and in the tops of said axles, and detachable filling pieces for the recesses in said crank case and axles, subtantially as described.

19. In a farm tractor the combination of an engine having hollow axles projecting laterally from the crank case thereof, recesses in the sides of the crank case and in the tops of the axles, detachable filling pieces fitting in said recesses, and seats on the crank case for ball bearings, substantially as described.

In testimony whereof I affix my signature in presence of two witnesses.

CORNELIUS MURNANE.

Witnesses:
M. STARFIELD,
E. HYDE.